United States Patent
Lin et al.

(10) Patent No.: US 7,707,906 B2
(45) Date of Patent: May 4, 2010

(54) ERGONOMIC INERTIAL POSITIONING SYSTEMS AND METHODS

(75) Inventors: Chih-Hung Lin, Taipei County (TW); Zhi-Hong Zhu, Taipei County (TW); Yung-Jin Wu, Tainan (TW); Tung-Wu Lu, Taipei County (TW); Shih-Hsiang Liu, Taichung (TW)

(73) Assignee: Institute for Information Industry, Taipei (TW)

( * ) Notice: Subject to any disclaimer, the term of this patent is extended or adjusted under 35 U.S.C. 154(b) by 1098 days.

(21) Appl. No.: 11/365,878

(22) Filed: Mar. 2, 2006

(65) Prior Publication Data

US 2007/0125173 A1    Jun. 7, 2007

(30) Foreign Application Priority Data

Dec. 5, 2005    (TW) .............................. 94142789 A

(51) Int. Cl.
*G01P 15/00*    (2006.01)
*G06F 15/00*    (2006.01)

(52) U.S. Cl. ........................................ 74/488; 702/141
(58) Field of Classification Search ........... 73/488–492; 701/1, 11, 48, 70, 220; 702/96, 141, 142; 180/281–282, 271
See application file for complete search history.

(56) References Cited

U.S. PATENT DOCUMENTS

| | | | | |
|---|---|---|---|---|
| 5,736,923 | A * | 4/1998 | Saab | 340/429 |
| 6,216,079 | B1 * | 4/2001 | Matsuda | 701/70 |
| 6,456,920 | B1 * | 9/2002 | Nishio et al. | 701/70 |
| 6,651,027 | B2 * | 11/2003 | McCall et al. | 702/141 |
| 6,915,205 | B2 * | 7/2005 | Kim et al. | 701/207 |
| 7,032,450 | B2 * | 4/2006 | Lee et al. | 73/488 |
| 2003/0158665 | A1 * | 8/2003 | McCall et al. | 701/220 |

FOREIGN PATENT DOCUMENTS

| | | |
|---|---|---|
| TW | 301711 | 4/1997 |
| TW | 593981 | 6/2004 |

* cited by examiner

*Primary Examiner*—Helen C. Kwok
(74) *Attorney, Agent, or Firm*—Birch, Stewart, Kolasch & Birch, LLP

(57) ABSTRACT

An ergonomic inertial positioning system comprises a motion sensor, an angle sensor, and a processor. The motion sensor detects movement of an object. The angle sensor detects angle variation of the heading of the object. The processor determines motion status of the object based on detected data provided by the motion sensor and the angle sensor, and calculates displacement of the object utilizing the detected angle variation thereof based on the motion status.

17 Claims, 4 Drawing Sheets

ERGONOMIC INERTIAL POSITIONING SYSTEMS AND METHODS

BACKGROUND OF THE INVENTION

1. Field of the Invention

The present invention relates to computer techniques, and more particularly to ergonomic inertial positioning systems and methods.

2. Description of the Related Art

Most current positioning techniques utilize signals from global positioning system (GPS) satellites or wireless local area networks (LAN) to calculate positions. GPS signals may be interrupted when the signal source is obstructed by buildings or forest. The accuracy of wireless-LAN-based positioning is easily affected by space factors, such as crowds.

Traditional inertial positioning measures the acceleration of an object to calculate the displacement thereof, and is thus not affected by the environment. Accelerators are more expensive as they offer improved accuracy in acceleration detection. Table 1 shows the exemplary accuracy and prices of accelerators.

TABLE 1

| | | Price | | |
|---|---|---|---|---|
| Time interval | | High(~$750,000) | Mid(~$100,000) | Low(~$10,000) |
| Distance error | 1 hour | 0.3 km~0.5 km | 1 km~3 km | 200 km~300 km |
| | 1 minute | 0.3 m~0.5 m | 0.5 m~3 m | 30 m~50 m |
| | 1 second | 0.01 m~0.02 m | 0.03 m~0.1 m | 0.3 m~0.5 m |

Traditional inertial positioning suffers from the accumulated errors caused by sensor noise or numerical calculation. As measured acceleration is integrated twice for displacement calculation, displacement errors increase progressively with time.

Traditional inertial positioning immune to environmental factors is typically implemented in aircrafts, vehicles, and similar machines due to regular and smooth variation in their velocities, but may not work with objects moving in complex ways, such as animals and humans.

BRIEF SUMMARY OF THE INVENTION

An exemplary embodiment of an ergonomic inertial positioning system comprises a motion sensor, an angle sensor, and a processor. The motion sensor detects movement of an object. The angle sensor detects angle variation of the heading of the object. The processor determines motion status of the object based on detected data provided by the motion sensor and the angle sensor, and calculates displacement of the object utilizing the detected angle variation thereof based on the motion status.

An exemplary embodiment of an ergonomic inertial positioning method is provided. Movement of an object is detected utilizing a motion sensor. Angle variation of the heading of the object is detected utilizing an angle sensor. Motion status of the object is determined based on detected data provided by the motion sensor and the angle sensor. Displacement of the object is calculated utilizing the detected angle variation thereof based on the motion status.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
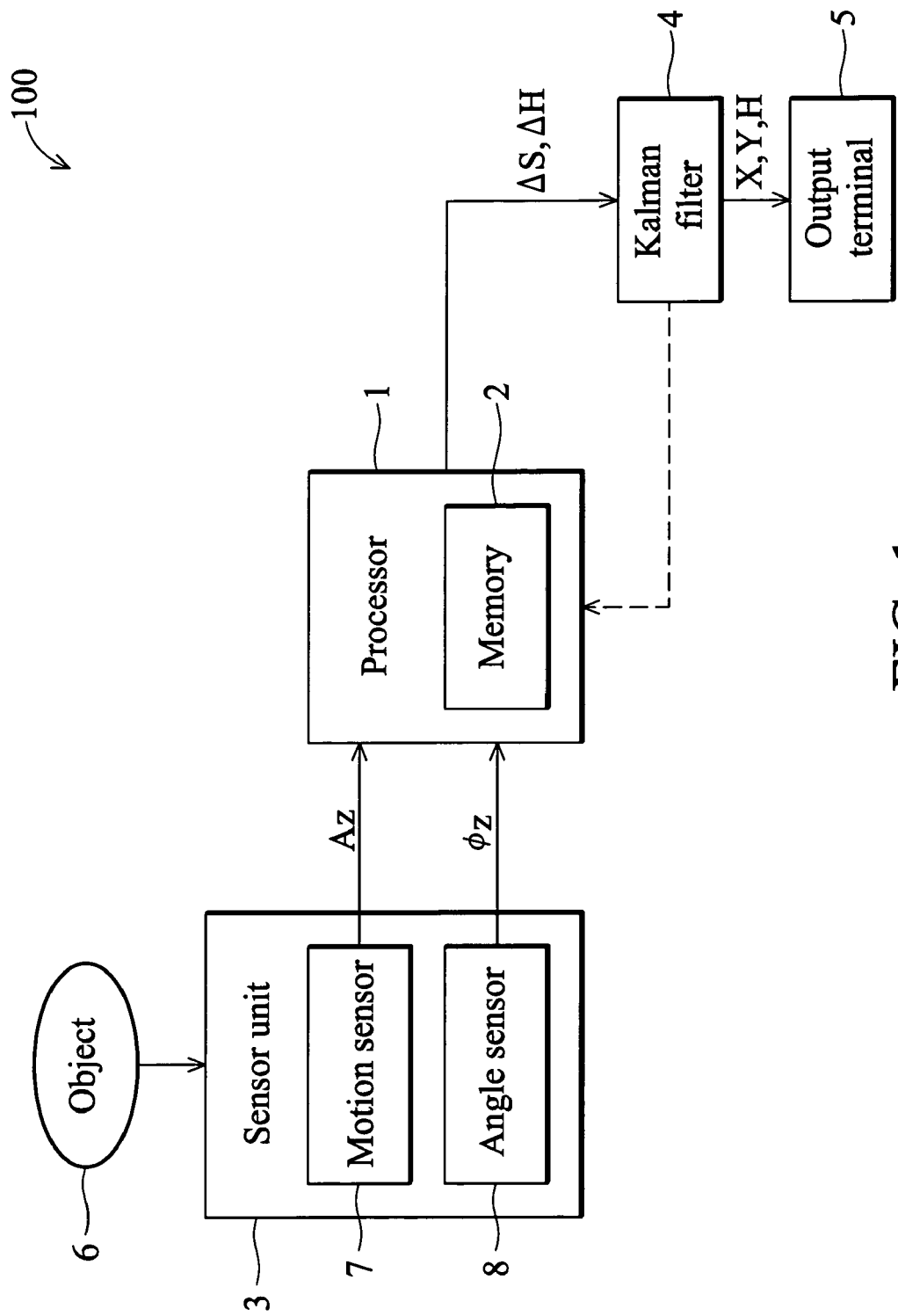
FIG. 1 is a block diagram of an exemplary embodiment of an ergonomic inertial positioning system.

Ergonomic inertial positioning system 100 in FIG. 1 comprises processor 1, memory 2, sensor unit 3, Kalman filter 4, output terminal 5, and object 6. Memory 2 may be a memory disposed outside of processor 1. Sensor unit 3 comprises sensors respectively detecting motion and angle variation of object 6. For example, sensor unit 3 comprises a single device implemented by motion sensor 7 and angle sensor 8 and is preferably disposed at the waist.

Figure 2:
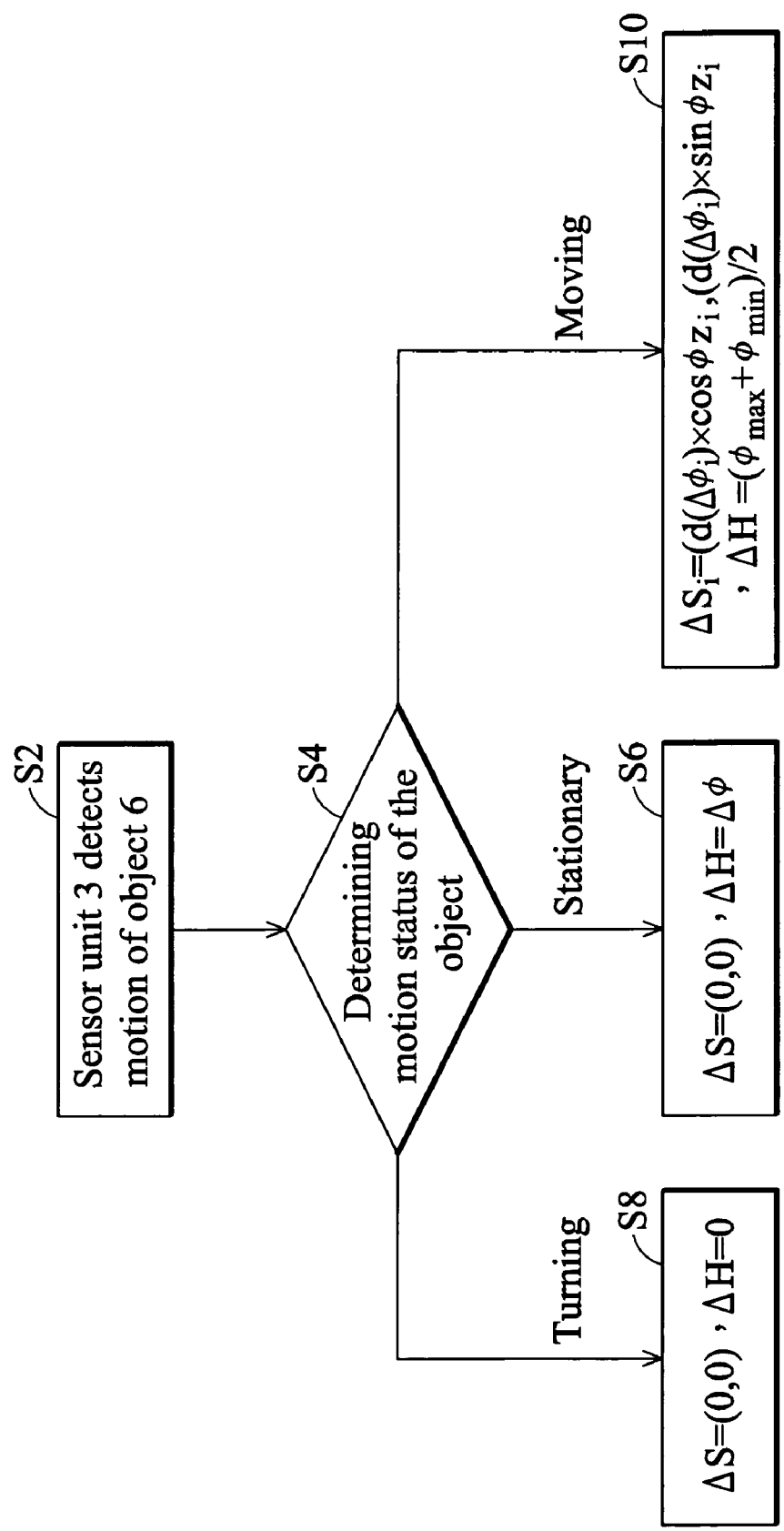
FIG. 2 is a flowchart of displacement calculation.

With reference to FIG. 2, sensor unit 3 detects motion of object 6 and transmits the detected data to processor 1 (step S2). Motion sensor 7 may comprise an accelerator detecting acceleration variation of object 6 in a substantially vertical direction (referred to as the z-axis in the following). Angle sensor 8 may comprise a magnetic sensor detecting angle variation of object 6 in a substantially horizontal plane. Processor 1 determines motion status of object 6 based on detected data provided by motion sensor 7 and angle sensor 8 (step S4), and calculates displacement of object 6 utilizing the detected angle variation thereof based on the determined motion status of object 6.

Motion status of object 6 may be classified as a stationary status, a turning status, and a moving status, each corresponding to a criterion. When acceleration variation detected by motion sensor 7 is less than a first threshold a, and angle variation detected by angle sensor 8 is less than a second threshold b, processor 1 determines that object 6 is in the stationary status.

When acceleration variation detected by motion sensor 7 is greater than the first threshold a, and angle variation detected by angle sensor 8 is in a range between a third threshold c and the second threshold b, processor 1 determines that object 6 is in the moving status.

When angle variation detected by angle sensor 8 is greater than the second threshold b, processor 1 determines that object 6 is in the turning status. The first threshold a is preferably between 2.0 m/s$^2$ and 5.5 m/s$^2$. The second threshold b is preferably between 10 degrees and 30 degrees. The third threshold c is preferably between 2 degrees and 5 degrees. Note that although processor 1 determines motion status of object 6 based on detected variation of acceleration on the Z-axis and the angle variation, motion status determination may utilize only one type of detected data.

Figure 3:
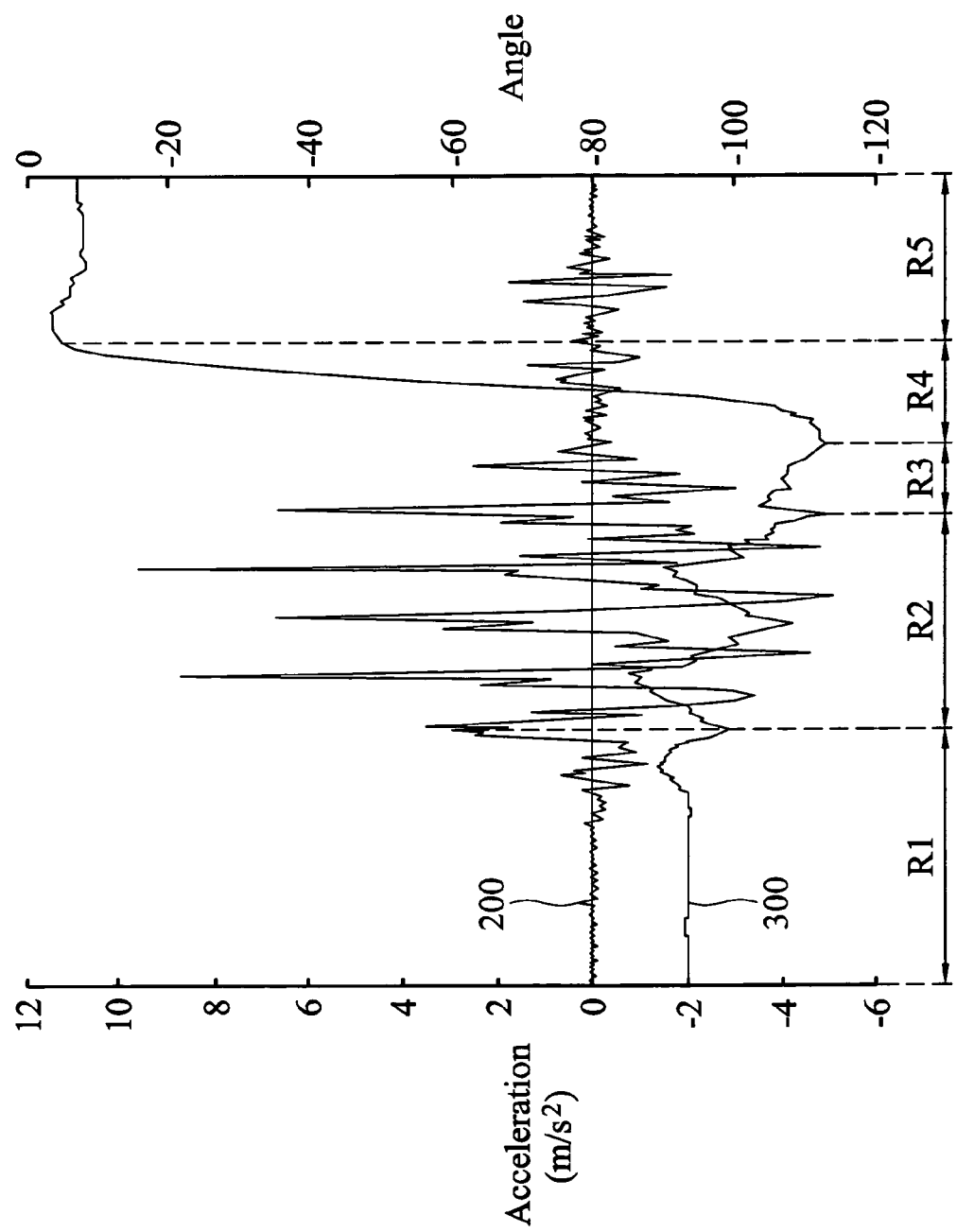
FIG. 3 is a schematic diagram showing data of acceleration and angle variation.

For example, detected data provided by motion sensor 7 and angle sensor 8 is shown in FIG. 3, wherein curves 200 and 300 are respectively acceleration variation and angle variation simultaneously detected by motion sensor 7 and angle sensor 8. Processor 1 determines motion status of object 6 based on criteria shown in table 2, wherein $\Delta\Phi$ is the difference between a reference angle and a peak value or a valley value on curve 300.

TABLE 2

| | variation of acceleration on the Z-axis (m/s2) | Angle variation $\Delta\Phi$ (degree) |
|---|---|---|
| Stationary status | <4 | $\Delta\Phi < 20$ |
| Moving status | >4 | $3 < \Delta\Phi < 20$ |
| Turning status | — | $\Delta\Phi > 20$ |

Processor 1 determines that periods R1, R3, and R5 represents stationary statuses of object 6, period R2 the moving status, and period R4 the turning status. When object 6 is in the stationary status, processor 1 computes object 6's displacement $\Delta S$ and heading angle variation $\Delta H$ by $\Delta S=(0,0)$ and $\Delta H=0$ (step S6). When object 6 is in the turning status, processor 1 computes displacement $\Delta S$ of object 6 and heading angle variation $\Delta H$ by $\Delta S=(0,0)$ and $\Delta H=\Delta\Phi$ (step S8).

When object 6 is in the moving status, processor 1 computes displacement $\Delta S$ object 6 at i-th step utilizing the following formula (step S10):

$$\Delta S_i = (d(\Delta\Phi_i) \times \cos\Phi z_i, d(\Delta\Phi_i) \times \sin\Phi z_i), \quad (1)$$

where i comprises a positive integer, $d(\Delta\Phi_i)$ is the pace of object 6 at the i-th step, $\Delta\Phi_i$ is the angle variation of object 6 at the i-th step, $\Phi z_i$ is an angle representing the heading of object 6 at the i-th step. When object 6 is in the moving status, angle sensor 8 detects a maximum angle and a minimum angle of headings of object 6 relative to a reference angle at the i-th step, and $\Delta\Phi_i$ is the difference between the maximum angle and the reference angle or the difference between the minimum angle and the reference angle. The reference angle may be adjusted during movement of object. Total displacement S of object 6 can be calculated utilizing the following formula:

$$S = \sum_i \Delta S_i = \sum_i (d(\Delta\Phi_i) \times \cos\Phi z_i, d(\Delta\Phi_i) \times \sin\Phi z_i) \quad (2)$$

When object 6 is in the moving status, processor 1 calculates paces thereof utilizing angle variation detected by angle sensor 8. According to experimental results, the pace of object 6 at the i-th step is preferably simulated by a three degree polynomial of a variable $\Delta\Phi_i$. In a preferred embodiment, processor 1 calculates pace $d(\Delta\Phi_i)$ of object 6 at the i-th step utilizing the following formula:

$$d(\Delta\Phi_i) = a_0 + (a_1 \times \Delta\Phi_i) + (a_2 \times \Delta\Phi_i^2) + (a_3 \times \Delta\Phi_i^3) + \ldots (a_n \times \Delta\Phi_i^n), \quad (3)$$

where n is a positive integer. The sensor unit, such a single device implemented by motion sensor 7 and angle sensor 8, is preferably disposed at the waist for better angle variation detection.

When n is two, the coefficients of the formula comprise $a_0=0.015489$, $a_1=0.086503$, and $a_2=-0.0018056$.

When n is three, the coefficients of the formula comprise $a_0=0.32396$, $a_1=-0.015814$, $a_2=0.0088312$, and $a_3=-0.00034889$.

When n is four, the coefficients of the formula comprise $a_0=0.57971$, $a_1=-0.12933$, $a_2=0.026913$, $a_3=-0.001578$, and $a_4=0.00003017$.

Figure 4:
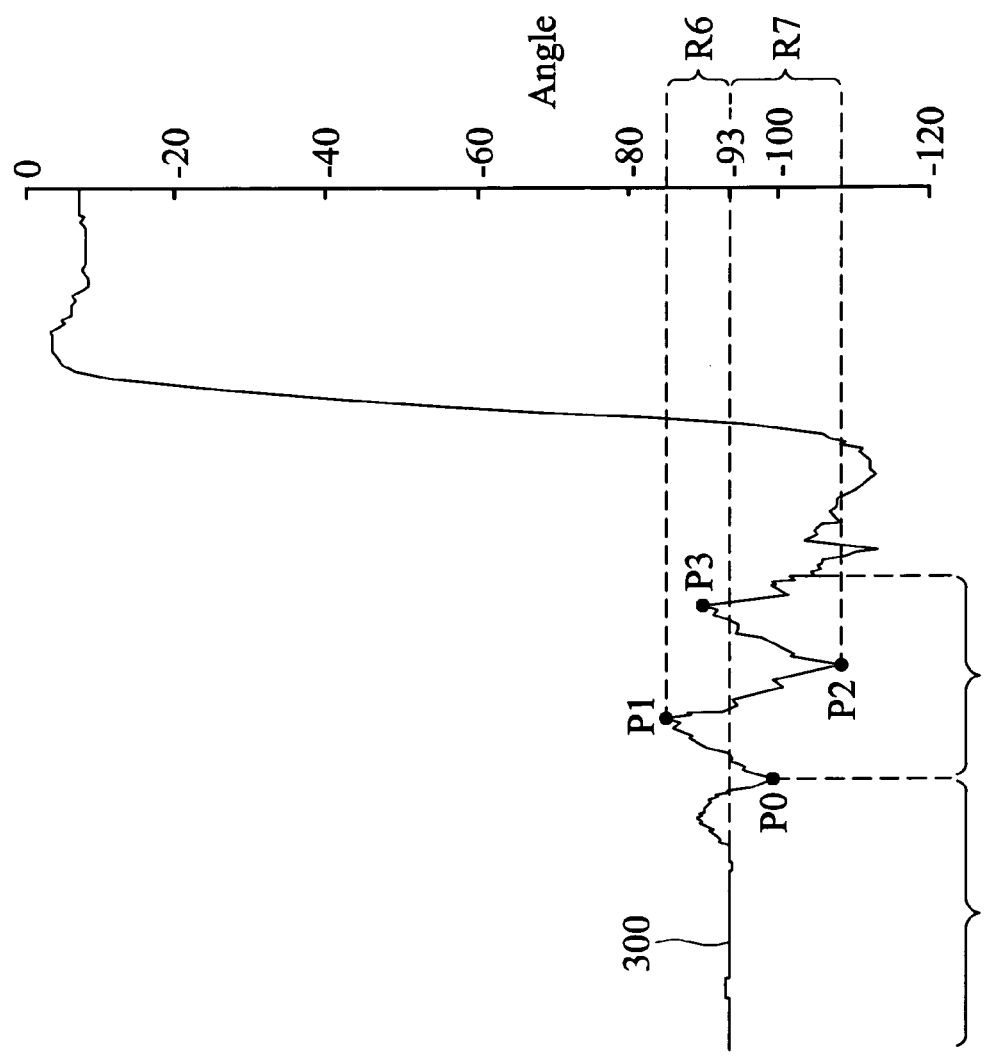
FIG. 4 is a schematic diagram showing data of angle variation.

Memory 2 stores data detected and provided by motion sensor 7 and angle sensor 8. Processor 1 may adjust the reference angle upon each retrieval of a detected peak or valley angle value. The reference angle may be derived with two schemes. First, the reference angle may be derived from a portion of curve 300 during a period when the angle variation of object 6 is less than a predetermined value. For example, the reference angle may comprise an average of detected angle data during period R1, -93 degree. In FIG. 4, P0 and P1 denote the first step of object 6, so $\Delta\Phi_1$ is R6. P1 and P2 denote the second step of object 6, so $\Delta\Phi_2$ is R7. Processor 1 may compute for positioning in real time at each step of object 6.

Additionally, processor 1 may calculate an average of the maximum angle and the minimum angle of the heading of object 6 at the i-th step to be a new reference angle and calculates angle variation $\Delta\Phi_{i+1}$ of the heading of object 6 based on the new reference angle.

For example, the average of corresponding angles of P1 and P2 is -96 degree. In FIG. 4, P2 and P3 denote the third step of object 6, so $\Delta\Phi_3$ comprises the difference between the new reference angle -96 degree and an angle corresponding to P3.

When object 6 in its first step, $\Phi z_i=0$. When i>1, $\Phi z_i$ comprises an average of a peak angle value $\Phi_{max}$ and a valley angle value $\Phi_{min}$, i.e. $\Phi z_i=(\Phi_{max}+\Phi_{min})/2$.

The system reduces time-dependent errors by avoiding acceleration integration. Motion sensor 7 is utilized to determine the motion status of object 6.

When the paces are simulated by a three degree polynomial, positioning utilizing the system with the cheapest accelerator described achieves a root mean square value 0.0633 m/step of position errors according to experiment results. If object 6 moves for one minute at a speed of two steps per second, a position error 7.6 m is obtained, only as much as ¼ to $^2$/$_{13}$ of an error the conventional positioning techniques would suffer in the same condition.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ergonomic inertial positioning system, comprising:
a motion sensor detecting movement of an object;
an angle sensor detecting angle variation of the heading of the object; and
a processor determining motion status of the object based on detected data provided by the motion sensor and the angle sensor, and calculating displacement $\Delta S_i$ of the object utilizing the detected angle variation thereof based on the motion status without integral calculation, wherein the determined motion status comprises a stationary status, a turning status, or a moving status, and the processor calculates the displacement $\Delta S_i$ of the object at a i-th step utilizing the following formula:

$$\Delta S_i = (d(\Delta \Phi_i) \times \cos \Phi z_i, d(\Delta \Phi_i) \times \sin \Phi z_i),$$

wherein i comprises a positive integer, $d(\Delta \Phi_i)$ is the pace of the object at the i-th step, $\Delta \Phi_i$ is the angle variation of the object at the i-th step, $\Phi z_i$ is an angle representing the heading of the object at the i-th step.

2. The system as claimed in claim 1, wherein the motion sensor detects acceleration variation of the object in a substantially vertical direction.

3. The system as claimed in claim 1, wherein the angle sensor detects angle variation of the object in a substantially horizontal plane.

4. The system as claimed in claim 1, wherein the motion sensor detects acceleration variation of the object in a substantially vertical direction, the angle sensor detects angle variation of the object in a substantially horizontal plane, when the acceleration variation detected by the motion sensor is less than a first threshold a, and the angle variation detected by the angle sensor is less than a second threshold b, the processor determines that the object is in the stationary status.

5. The system as claimed in claim 4, wherein, when the acceleration variation detected by the motion sensor is greater than the first threshold a, and the angle variation detected by the angle sensor is in a range between a third threshold c and the second threshold b, the processor determines that the object is in the moving status.

6. The system as claimed in claim 4, wherein, when the angle variation detected by the angle sensor is greater than the second threshold b, the processor determines that the object is in the turning status.

7. The system as claimed in claim 4, wherein the first threshold a is between 2.0 m/s² and 5.5 m/s².

8. The system as claimed in claim 4, wherein the second threshold b is between 10 degrees and 30 degrees.

9. The system as claimed in claim 5, wherein the second threshold b is between 10 degrees and 30 degrees, and the third threshold c is between 2 degrees and 5 degrees.

10. The system as claimed in claim 1, wherein the pace $d(\Delta \Phi_i)$ of the object at the i-th step is a n-th degree polynomial of the $\Delta \Phi_i$, wherein n is a positive integer.

11. The system as claimed in claim 10, wherein, when the object is in the moving status, the angle sensor detects a maximum angle and a minimum angle of headings of the object relative to a reference angle at the i-th step, and $\Delta \Phi_i$ is the difference between the maximum angle and the reference angle or the difference between the minimum angle and the reference angle.

12. The system as claimed in claim 11, wherein the processor calculates the pace $d(\Delta \Phi_i)$ of the object at the i-th step utilizing the following formula:

$$d(\Delta \Phi_i) = a_0 + (a_1 \times \Delta \Phi_i) + (a_2 \times \Delta \Phi_i^2) + (a_3 \times \Delta \Phi_i^3) + \ldots (a_n \times \Delta \Phi_i^n),$$

wherein, when n is two, the coefficients thereof comprise $a_0 = 0.015489$, $a_1 = 0.086503$, and $a_2 = -0.0018056$;
when n is three, the coefficients thereof comprise $a_0 = 0.32396$, $a_1 = -0.015814$, $a_2 = 0.0088312$, and $a_3 = -0.00034889$; and
when n is four, the coefficients thereof comprise $a_0 = 0.57971$, $a_1 = -0.12933$, $a_2 = 0.026913$, $a_3 = -0.001578$, and $a_4 = 0.00003017$.

13. The system as claimed in claim 11, further comprising a memory storing an angle variation curve provided by the angle sensor during a period when the angle variation of the object is less than a predetermined value, wherein the reference angle is derived from the angle variation curve.

14. The system as claimed in claim 11, wherein the processor treats an average of the maximum angle and the minimum angle as a new reference angle and calculates angle variation of the heading of the object based on the new reference angle.

15. An ergonomic inertial positioning method, comprising:
utilizing a motion sensor to detect movement of an object;
utilizing an angle sensor to detect angle variation of the heading of the object;
determining motion status of the object based on detected data provided by the motion sensor and the angle sensor; and
calculating displacement $\Delta S_i$ of the object at a i-th step utilizing the following formula:

$$\Delta S_i = (d(\Delta \Phi_i) \times \cos \Phi z_i, d(\Delta \Phi_i) \times \sin \Phi z_i),$$

wherein i comprises a positive integer, $d(\Delta \Phi_i)$ is the pace of the object at the i-th step, $\Delta \Phi_i$ is the angle variation of the object at the i-th step, $\Phi z_i$ is an angle representing the heading of the object at the i-th step, wherein the motion sensor detects acceleration variation of the object in a substantially vertical direction, and the angle sensor detects angle variation of the object in a substantially horizontal plane.

16. The method as claimed in claim 15, wherein the determined motion status comprises a stationary status, a turning status, or a moving status.

17. The method as claimed in claim 16, further comprising:
when the acceleration variation detected by the motion sensor is less than a first threshold a, and the angle variation detected by the angle sensor is less than a second threshold b, determining that the object is in the stationary status;
when the acceleration variation detected by the motion sensor is greater than the first threshold a, and the angle variation detected by the angle sensor is in a range between a third threshold c and the second threshold b, determining that the object is in the moving status; and
when the angle variation detected by the angle sensor is greater than the second threshold b, determining that the object is in the turning status.

* * * * *